Dec. 8, 1959 P. HARTMANN 2,915,980
PUMP OR MOTOR
Filed April 22, 1957 2 Sheets-Sheet 1

INVENTOR:
PHILIP HARTMANN
BY: *Arthur J. Hanomann*
ATTORNEY

Dec. 8, 1959     P. HARTMANN     2,915,980
PUMP OR MOTOR

Filed April 22, 1957     2 Sheets-Sheet 2

INVENTOR:
PHILIP HARTMANN
BY: *Arthur J. Hansmann*
ATTORNEY

United States Patent Office 2,915,980
Patented Dec. 8, 1959

2,915,980

PUMP OR MOTOR

Philip Hartmann, Racine, Wis., assignor to Hartmann Manufacturing Company, Racine, Wis., a corporation of Wisconsin Application April 22, 1957, Serial No. 654,236

3 Claims. (Cl. 103—125)

This invention relates to a fluid pump or motor, and, more specifically, it relates to a reversible pump or motor of high fluid pressure application.

Considerable inventing has been done in the field of pumps and motors; yet, with the increased demand for higher efficiencies, lower costs, more power, etc., no pump or motor is known to be designed for performance comparable to the one described herein. It has long been known that pumps and motors must overcome the resisting pressures of the fluid mediums not just in the direction of movement of the mediums but also in other directions, since the fluid medium will exert forces in all directions. This fact caused the fluids to exert an axial force on the pump or motor rotor, and, consequently, the axial force must be overcome and it causes the rotor to bear against the housing with loss in efficiency and excessive wear.

It is an object of this invention to provide a fluid pump or motor with an improved porting system for conducting the fluid through the pump or motor. This object particularly results in balanced axial thrusts on the rotor.

Another object of this invention is to provide a fluid pump or motor with a high efficiency and for high torque at a slow speed if desired. The accomplishment of this object results in a pump or motor which can be operated under high fluid pressures but at a slow speed and a constant motion without jerking. There is a demand for a motor with these qualifications for use in driving conveyors, power tools, and other mechanisms.

Still another object of this invention is to provide a fluid pump or motor which can be changed in capacity by merely changing a part or two.

A general object of this invention is to improve fluid pumps and motors as presently known.

Other objects and advantages will become apparent upon reading the following description in conjunction with the accompanying drawings, wherein.

The same reference numerals refer to the same parts throughout the several views.

Figure 1:
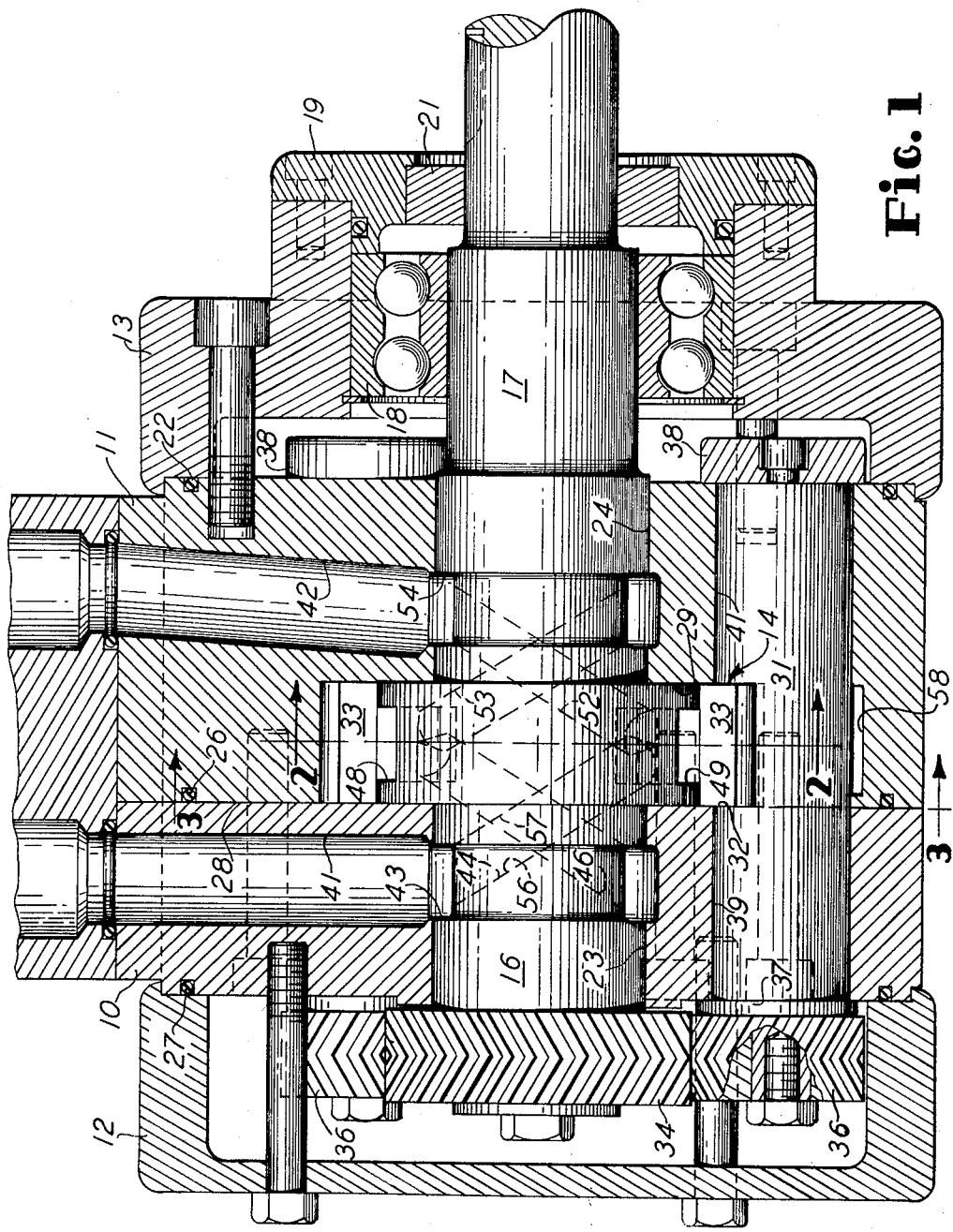
Fig. 1 is a sectional view of a preferred embodiment of a fluid pump or motor of this invention, with the section taken on the line 1—1 of Fig. 3.

The drawings show a fluid pump or motor consisting of a housing including sections 10 and 11, and end cover plates 12 and 13. A rotor 14 is rotatably disposed between the sections 10 and 11, and shaft portions 16 and 17 are shown integral with the rotor and projecting to axially opposite sides thereof. A conventional two-row ball bearing 18 rotatably supports the shaft portion 17 in the housing cover plate 13, and a cap 19 and a seal 21 also surround the shaft. An O-ring 22 fluid tightly seals the plate 13 with the housing section 11. At this point it should be noticed that the shaft portions and the housing sections have long bearing surfaces at 23 and 24, and this is provided for high fluid pressure operation along with other similar features mentioned later. Two other O-rings 26 and 27 are respectively disposed between the housing sections 10 and 11, and the housing section 10 and the cover plate 12. Here also, a wide annular sealing surface 28 is provided between the housing sections to minimize the possibility of fluid leaks when under high fluid pressure. Of course, the various parts of the pump or motor are bolted together in the usual manner, such as that shown.

The housing section 11 has a circular working chamber 29 formed in one face thereof and the chamber snugly receives the rotor 14. Also, four rollers or gates 31 are rotatably mounted in the housing sections 10 and 11 to extend across the plane of the rotor 14, as shown. The rollers are all provided with cut-outs or openings 32 in one side thereof and intermediate therealong. Of course, the openings are of a length to have the two diametrically opposite vanes 33 of the rotor 14 snugly pass through the openings upon rotation of both the rotor and the rollers. To assure perfect timing between the rotor and the roller rotation, herringbone gears 34 and 36 are keyed to the end of the rotor shaft 16 and to the ends of each roller 31, respectively. To keep the rollers in axially fixed positions, end plates 37 and 38 are secured thereto as shown. Of course, the herringbone gears maintain the rotating parts in their axial positions.

Here also it should be noticed that substantial lengths of bearing surfaces 39 and 41 are respectively provided on opposite ends of the rollers and this insures a fluid tight structure at these points. Further, the rollers are of a large uniform diameter for their extents through the housing sections 10 and 11, and this feature permits the rollers to be utilized as alignment pins between the two housing sections. This feature of alignment is important for high pressure operation. Also, the capacity of the pump or motor can be very easily altered by exchanging the rollers shown for rollers having different size of openings 32 and by exchanging the rotor shown for a rotor having vanes 33 of a size corresponding to the new openings 32. Since both the rotor and the rollers have substantial lengths to both sides of the center planes thereof, they are both sturdy and well balanced.

Figure 2:
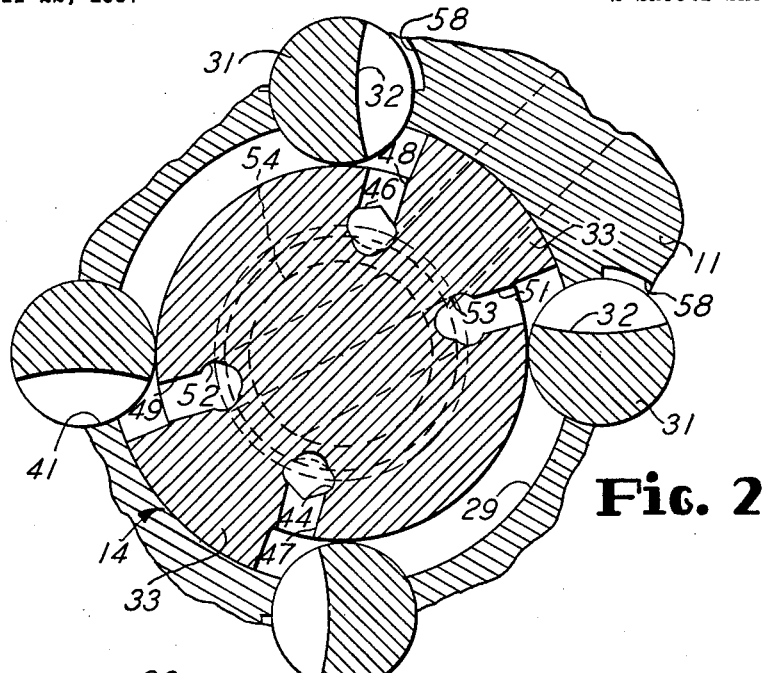
Fig. 2 is a sectional view taken on the line 2—2 of Fig. 1 but with the rotor shown rotated forty-five degrees and the rollers correspondingly rotated.
Figure 3:
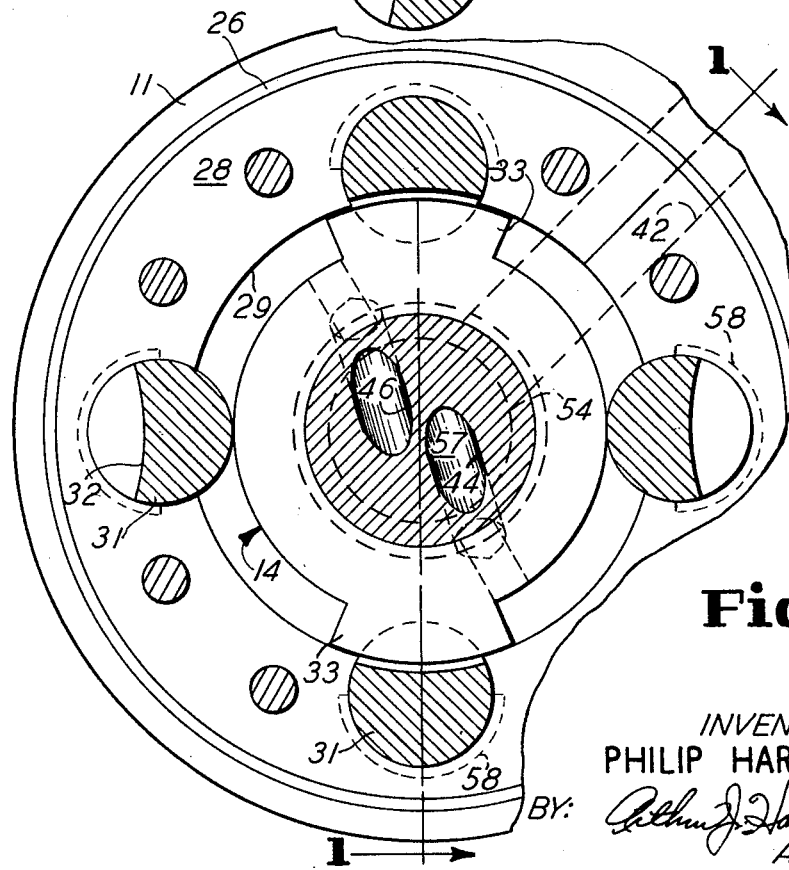
Fig. 3 is a sectional view taken on the line 3—3 of Fig. 1.

An important feature of the pump or motor is the arrangement of the fluid passageways through the housing. Of the two fluid passageways 41 and 42 shown in the respective housing sections 10 and 11, either one can be employed as the inlet while the other one is the outlet. When the inlet 41 is employed in the motor, fluid enters the housing to the annular chamber 43 formed in both the housing section 10 and the shaft 16. From there the fluid can enter the two passages 44 and 46 and flow to the openings 47 and 48 and into the working chamber 29. Figs. 2 and 3, particularly, show the openings 47 and 48 located in the rotor at diametrically opposite positions which locate the openings on the rotationally trailing sides of the rotor vanes 33. Thus, the rotor is forced to rotate clockwise as the rollers 31 also rotate as indicated.

The rotor is symmetrical about a transverse center plane and thus openings 49 and 51 are provided on the opposite side of the vanes, and passages 52 and 53 communicate between the openings and the annular chamber 54. The fluid thus has an outlet throgh the passages 52 and 53 and the passageway 42. In all instances, the passages and their corresponding openings are considered to each form one passage extended completely through the rotor.

It should be remembered that this pump or motor is intended to withstand high fluid pressures and yet operate at slow speeds without slip. For this reason, the substantial sealing surfaces mentioned are provided and the structure is as described. Since high pressures are intended, it is important to eliminate axial force on the rotor to avoid inefficiency, heat, wear, jerky rotation, and other undesirable results. With the two pairs of passages 44 and 46, and 52 and 53, the fluid pressure is balanced in both axial directions on the entire rotor. Thus, the rotor has no tendency to bear against the sides of the housing sections or against the walls of the openings in the rollers. Note that the axially projected area of the left side of the opening 47 and the left side indicated 56 of the passage 44 is equal to the axially projected area of the right side of the opening 47 and the right side indicated 57 of the passage 44. All other passages and openings and chambers in the rotor are similarly axially balanced and, therefore, there is no axial force on the rotor.

Further, note that the housing section 11 is provided with relief openings 58 semi-circularly surrounding each roller 31. In this manner, fluid can flow behind the roller to balance the pressure of the fluid around the roller rather than create a force against the roller.

While a specific embodiment of this invention has been shown and described, it should be obvious that certain changes could be made therein and the scope of this invention should, therefore, be limited only by the appended claims.

What is claimed is:

1. A fluid pump or motor comprising a housing having a working chamber, a rotor rotatably mounted in said housing working chamber and including two diametrically opposite vanes, said rotor having a first pair of fluid passages extending therethrough from said working chamber and open at diametrically opposite sides of said rotor adjacent said vanes on one rotational side thereof and to a first transverse plane axially spaced from said working chamber to one side thereof, said housing having a first fluid passageway in communication with said first pair of passages at said first transverse plane, said rotor having a second pair of separate fluid passages extending therethrough from said working chamber and open at diametrically opposite sides of said rotor adjacent said vanes and on the other rotational side thereof and to a second transverse plane axially spaced from said working chamber to the other side thereof, said housing having a second fluid passageway in communication with said second pair of fluid passages at said second transverse plane, said passages being formed to present equal projected areas on the opposite walls of and for the entire lengths of said passages and axially with respect to said rotor for effecting axially balanced fluid pressures in said passages, and means for fluid sealing said chamber with said rotor before and after the movement of said vanes through said chamber.

2. A high pressure type of fluid pump or motor of the type including a housing and a shaft supporting a rotor with two diametrically opposite vanes and including rollers having vane openings and disposed in said housing transverse to the path of said vanes to rotate in synchronization with the rotation of said vanes which pass through said vane openings, the system of porting said pump or motor by said housing having two separate fluid passageways therein spaced apart and in fluid communication with the interior of said housing on axially opposite sides of said rotor, said rotor having a pair of fluid passages in fluid communication with each said passageway and extending through said rotor to separate rotational sides of said vanes, said passages being disposed and shaped to present equal projected areas on the entire axially opposite sides of said passages, as projected axially of said rotor, for having axially balanced fluid forces acting in said passages.

3. A high pressure fluid pump or motor of the type including a housing and a shaft supporting a rotor with a radially projecting vane and including roller gates rotatably mounted in said housing in the path of said vane and having openings for movement therethrough of said vane, the system of porting said pump or motor by providing said housing with a fluid passageway disposed axially offset from each side of the plane of rotation of said vane, said housing having an annular fluid chamber in communication with the interior end of each said passageway and concentric with said rotor and encircling each end of said shaft, and said rotor having fluid passages obliquely disposed therethrough and of a length for respectively communicating with each said chamber and rotationally opposite sides of said vane, and the entire said length of said passages being formed for presenting equal total areas, on axially opposite sides projected axially of said rotor, for balancing the axial forces of fluid flowing through said passages.

References Cited in the file of this patent

UNITED STATES PATENTS

| Re. 22,818 | Berry | Dec. 17, 1946 |
|---|---|---|
| 622,949 | Green | Apr. 11, 1899 |
| 791,147 | Green | May 30, 1905 |
| 835,330 | Story | Nov. 6, 1906 |
| 872,040 | Anderson et al. | Nov. 26, 1907 |
| 925,467 | Eaton | June 22, 1909 |
| 973,190 | Green | Oct. 18, 1910 |
| 994,311 | Green | June 6, 1911 |
| 1,027,091 | Weddington | May 21, 1912 |
| 1,078,870 | Nyquist | Nov. 18, 1913 |
| 1,268,248 | Jackman et al. | June 4, 1918 |
| 1,269,735 | Ogden | June 18, 1918 |
| 1,272,876 | Tygard | July 16, 1918 |
| 1,311,858 | Fischer | July 29, 1919 |
| 1,395,114 | Jackman | Oct. 25, 1921 |
| 1,729,826 | Green | Oct. 1, 1929 |
| 1,751,843 | Rosett | Mar. 25, 1930 |